United States Patent
Lin et al.

(10) Patent No.: US 11,956,253 B1
(45) Date of Patent: Apr. 9, 2024

(54) RANKING CYBERSECURITY ALERTS FROM MULTIPLE SOURCES USING MACHINE LEARNING

(71) Applicant: Exabeam, Inc., Foster City, CA (US)

(72) Inventors: Derek Lin, San Mateo, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 277 days.

(21) Appl. No.: 17/239,426

(22) Filed: Apr. 23, 2021

Related U.S. Application Data

(60) Provisional application No. 63/039,347, filed on Jun. 15, 2020.

(51) Int. Cl.
  *H04L 9/40* (2022.01)
  *G06N 5/04* (2023.01)
  *G06N 20/00* (2019.01)

(52) U.S. Cl.
  CPC .......... *H04L 63/1416* (2013.01); *G06N 5/04* (2013.01); *G06N 20/00* (2019.01)

(58) Field of Classification Search
  CPC ....... H04L 63/1416; G06N 20/00; G06N 5/04
  See application file for complete search history.

(56) References Cited

U.S. PATENT DOCUMENTS

| | | |
|---|---|---|
| 5,941,947 A | 8/1999 | Brown et al. |
| 6,223,985 B1 | 5/2001 | DeLude |
| 6,594,481 B1 | 7/2003 | Johnson et al. |
| 7,181,768 B1 | 2/2007 | Ghosh et al. |
| 7,624,277 B1 | 11/2009 | Simard et al. |
| 7,668,776 B1 | 2/2010 | Ahles |
| 8,326,788 B2 | 12/2012 | Allen et al. |
| 8,443,443 B2 | 5/2013 | Nordstrom et al. |
| 8,479,302 B1 | 7/2013 | Lin |
| 8,484,230 B2 | 7/2013 | Harnett et al. |

(Continued)

OTHER PUBLICATIONS

Bahnsen, Alejandro Correa "Classifying Phishing URLs Using Recurrent Neural Networks", IEEE 2017.

(Continued)

*Primary Examiner* — Daniel B Potratz
*Assistant Examiner* — Matthias Habtegeorgis
(74) *Attorney, Agent, or Firm* — Lessani Law Group, PC

(57) ABSTRACT

The present disclosure relates to a machine-learning system, method, and computer program for ranking security alerts from multiple sources. The system self-learns risk levels associated with alerts by calculating risk probabilities for the alerts based on characteristics of the alerts and historical alert data. In response to receiving a security alert from one of a plurality of alert-generation sources, the alert-ranking system evaluates the security alert with respect to a plurality of feature indicators. The system creates a feature vector for the security alert based on the feature indicator values identified for the alert. The system then calculates a probability that the security alert relates to a cybersecurity risk in the computer network based on the created feature vector and historical alert data in the network. The system ranks alerts from a plurality of different sources based on the calculated cybersecurity risk probabilities.

9 Claims, 4 Drawing Sheets

(56) References Cited

U.S. PATENT DOCUMENTS

| | | | |
|---|---|---|---|
| 8,539,088 B2 | 9/2013 | Zheng | |
| 8,583,781 B2 | 11/2013 | Raleigh | |
| 8,606,913 B2 | 12/2013 | Lin | |
| 8,676,273 B1 | 3/2014 | Fujisake | |
| 8,850,570 B1 | 9/2014 | Ramzan | |
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,129,110 B1* | 9/2015 | Mason | G06F 21/562 |
| 9,185,095 B1 | 11/2015 | Moritz et al. | |
| 9,189,623 B1 | 11/2015 | Lin et al. | |
| 9,202,052 B1 | 12/2015 | Fang et al. | |
| 9,680,938 B1 | 6/2017 | Gil et al. | |
| 9,690,938 B1 | 6/2017 | Saxe et al. | |
| 9,692,765 B2 | 6/2017 | Choi et al. | |
| 9,760,240 B2 | 9/2017 | Maheshwari et al. | |
| 9,779,253 B2 | 10/2017 | Mahaffey et al. | |
| 9,798,883 B1 | 10/2017 | Gil et al. | |
| 9,843,596 B1 | 12/2017 | Averbuch et al. | |
| 9,898,604 B2 | 2/2018 | Fang et al. | |
| 10,063,582 B1 | 8/2018 | Feng et al. | |
| 10,095,871 B2 | 10/2018 | Gil et al. | |
| 10,178,108 B1 | 1/2019 | Lin et al. | |
| 10,354,015 B2 | 7/2019 | Kalchbrenner et al. | |
| 10,360,387 B2* | 7/2019 | Jou | H04L 63/1433 |
| 10,397,272 B1 | 8/2019 | Bruss et al. | |
| 10,419,470 B1 | 9/2019 | Segev et al. | |
| 10,445,311 B1 | 10/2019 | Saurabh et al. | |
| 10,467,631 B2 | 11/2019 | Dhurandhar et al. | |
| 10,474,828 B2 | 11/2019 | Gil et al. | |
| 10,496,815 B1 | 12/2019 | Steiman et al. | |
| 10,621,343 B1 | 4/2020 | Maciejak et al. | |
| 10,645,109 B1 | 5/2020 | Lin et al. | |
| 10,685,293 B1 | 6/2020 | Heimann et al. | |
| 10,803,183 B2 | 10/2020 | Gil et al. | |
| 10,819,724 B2 | 10/2020 | Amiri et al. | |
| 10,841,338 B1 | 11/2020 | Lin et al. | |
| 10,887,325 B1 | 1/2021 | Lin et al. | |
| 10,944,777 B2 | 3/2021 | Lin et al. | |
| 11,017,173 B1 | 5/2021 | Lu et al. | |
| 11,080,483 B1 | 8/2021 | Islam et al. | |
| 11,080,591 B2 | 8/2021 | van den Oord et al. | |
| 11,140,167 B1 | 10/2021 | Lin et al. | |
| 11,151,471 B2* | 10/2021 | Niininen | H04L 41/147 |
| 11,178,168 B1 | 11/2021 | Lin et al. | |
| 11,245,716 B2 | 2/2022 | Roelofs et al. | |
| 11,423,143 B1 | 8/2022 | Lin et al. | |
| 11,431,741 B1 | 8/2022 | Lin et al. | |
| 11,625,366 B1 | 4/2023 | Steiman et al. | |
| 2002/0107926 A1 | 8/2002 | Lee | |
| 2003/0065926 A1* | 4/2003 | Schultz | G06F 21/562 |
| | | | 713/188 |
| 2003/0147512 A1 | 8/2003 | Abburi | |
| 2004/0073569 A1 | 4/2004 | Knott et al. | |
| 2006/0090198 A1 | 4/2006 | Aaron | |
| 2007/0156771 A1 | 7/2007 | Hurley et al. | |
| 2007/0282778 A1 | 12/2007 | Chan et al. | |
| 2008/0028467 A1 | 1/2008 | Kommareddy et al. | |
| 2008/0040802 A1 | 2/2008 | Pierson et al. | |
| 2008/0170690 A1 | 7/2008 | Tysowski | |
| 2008/0262990 A1 | 10/2008 | Kapoor et al. | |
| 2008/0301780 A1 | 12/2008 | Ellison et al. | |
| 2009/0144095 A1 | 6/2009 | Shahi et al. | |
| 2009/0171752 A1 | 7/2009 | Galvin et al. | |
| 2009/0292954 A1* | 11/2009 | Jiang | H04L 41/0681 |
| | | | 714/E11.197 |
| 2009/0293121 A1 | 11/2009 | Bigus et al. | |
| 2010/0125911 A1 | 5/2010 | Bhaskaran | |
| 2010/0191763 A1 | 7/2010 | Wu | |
| 2010/0269175 A1 | 10/2010 | Stolfo et al. | |
| 2010/0284282 A1 | 11/2010 | Golic | |
| 2011/0167495 A1 | 7/2011 | Antonakakis et al. | |
| 2012/0278021 A1 | 11/2012 | Lin et al. | |
| 2012/0316835 A1 | 12/2012 | Maeda et al. | |
| 2012/0316981 A1 | 12/2012 | Hoover et al. | |
| 2013/0080631 A1 | 3/2013 | Lin | |
| 2013/0117554 A1 | 5/2013 | Ylonen | |
| 2013/0197998 A1 | 8/2013 | Buhrmann et al. | |
| 2013/0227643 A1 | 8/2013 | Mccoog et al. | |
| 2013/0268260 A1 | 10/2013 | Lundberg et al. | |
| 2013/0305357 A1 | 11/2013 | Ayyagari et al. | |
| 2013/0340028 A1 | 12/2013 | Rajagopal et al. | |
| 2014/0007238 A1 | 1/2014 | Magee | |
| 2014/0090058 A1 | 3/2014 | Ward et al. | |
| 2014/0101759 A1 | 4/2014 | Antonakakis et al. | |
| 2014/0315519 A1 | 10/2014 | Nielsen | |
| 2015/0026027 A1 | 1/2015 | Priess et al. | |
| 2015/0039543 A1 | 2/2015 | Athmanathan et al. | |
| 2015/0046969 A1 | 2/2015 | Abuelsaad et al. | |
| 2015/0100558 A1* | 4/2015 | Fan | G06F 18/22 |
| | | | 707/698 |
| 2015/0121503 A1 | 4/2015 | Xiong | |
| 2015/0205944 A1 | 7/2015 | Turgeman | |
| 2015/0215325 A1 | 7/2015 | Ogawa | |
| 2015/0339477 A1 | 11/2015 | Abrams et al. | |
| 2015/0341379 A1 | 11/2015 | Lefebvre et al. | |
| 2015/0363691 A1 | 12/2015 | Gocek et al. | |
| 2016/0005044 A1 | 1/2016 | Moss et al. | |
| 2016/0021117 A1 | 1/2016 | Harmon et al. | |
| 2016/0063397 A1 | 3/2016 | Ylipaavalniemi et al. | |
| 2016/0292592 A1 | 10/2016 | Patthak et al. | |
| 2016/0306965 A1 | 10/2016 | Iyer et al. | |
| 2016/0364427 A1 | 12/2016 | Wedgeworth, III | |
| 2017/0019506 A1 | 1/2017 | Lee et al. | |
| 2017/0024135 A1 | 1/2017 | Christodorescu et al. | |
| 2017/0127016 A1 | 5/2017 | Yu et al. | |
| 2017/0155652 A1 | 6/2017 | Most et al. | |
| 2017/0161451 A1 | 6/2017 | Weinstein et al. | |
| 2017/0178026 A1 | 6/2017 | Thomas et al. | |
| 2017/0213025 A1 | 7/2017 | Srivastav et al. | |
| 2017/0236081 A1 | 8/2017 | Grady Smith et al. | |
| 2017/0264679 A1 | 9/2017 | Chen et al. | |
| 2017/0318034 A1 | 11/2017 | Holland et al. | |
| 2017/0323636 A1 | 11/2017 | Xiao et al. | |
| 2018/0004961 A1 | 1/2018 | Gil et al. | |
| 2018/0048530 A1 | 2/2018 | Nikitaki et al. | |
| 2018/0063168 A1 | 3/2018 | Sofka | |
| 2018/0069893 A1 | 3/2018 | Amit et al. | |
| 2018/0075343 A1 | 3/2018 | van den Oord et al. | |
| 2018/0089304 A1 | 3/2018 | Vizer et al. | |
| 2018/0097822 A1 | 4/2018 | Huang et al. | |
| 2018/0144139 A1 | 5/2018 | Cheng et al. | |
| 2018/0157963 A1 | 6/2018 | Salti et al. | |
| 2018/0165554 A1 | 6/2018 | Zhang et al. | |
| 2018/0181883 A1* | 6/2018 | Ikeda | H04L 63/1425 |
| 2018/0190280 A1 | 7/2018 | Cui et al. | |
| 2018/0234443 A1 | 8/2018 | Wolkov et al. | |
| 2018/0248895 A1 | 8/2018 | Watson et al. | |
| 2018/0285340 A1 | 10/2018 | Murphy et al. | |
| 2018/0288063 A1 | 10/2018 | Koottayi et al. | |
| 2018/0288086 A1 | 10/2018 | Amiri et al. | |
| 2018/0307994 A1 | 10/2018 | Cheng et al. | |
| 2018/0316701 A1* | 11/2018 | Holzhauer | H04L 63/1433 |
| 2018/0322368 A1 | 11/2018 | Zhang et al. | |
| 2019/0014149 A1 | 1/2019 | Cleveland et al. | |
| 2019/0028496 A1 | 1/2019 | Fenoglio et al. | |
| 2019/0034641 A1 | 1/2019 | Gil et al. | |
| 2019/0066185 A1 | 2/2019 | More et al. | |
| 2019/0080225 A1 | 3/2019 | Agarwal | |
| 2019/0089721 A1 | 3/2019 | Pereira et al. | |
| 2019/0103091 A1 | 4/2019 | Chen | |
| 2019/0114419 A1 | 4/2019 | Chistyakov et al. | |
| 2019/0124045 A1 | 4/2019 | Zong et al. | |
| 2019/0132629 A1 | 5/2019 | Kendrick | |
| 2019/0149565 A1 | 5/2019 | Hagi et al. | |
| 2019/0171655 A1 | 6/2019 | Psota et al. | |
| 2019/0182280 A1 | 6/2019 | La Marca et al. | |
| 2019/0205750 A1 | 7/2019 | Zheng et al. | |
| 2019/0213247 A1 | 7/2019 | Pala et al. | |
| 2019/0244603 A1 | 8/2019 | Angkititrakul et al. | |
| 2019/0303703 A1 | 10/2019 | Kumar et al. | |
| 2019/0318100 A1 | 10/2019 | Bhatia et al. | |
| 2019/0334784 A1 | 10/2019 | Kvernvik et al. | |
| 2019/0349400 A1 | 11/2019 | Bruss et al. | |

(56) References Cited

U.S. PATENT DOCUMENTS

| | | |
|---|---|---|
| 2019/0378051 A1 | 12/2019 | Widmann et al. |
| 2020/0021607 A1 | 1/2020 | Muddu et al. |
| 2020/0021620 A1 | 1/2020 | Puratheppparambil et al. |
| 2020/0082098 A1 | 3/2020 | Gil et al. |
| 2020/0228557 A1 | 7/2020 | Lin et al. |
| 2020/0302118 A1 | 9/2020 | Cheng et al. |
| 2020/0327886 A1 | 10/2020 | Shalaby et al. |
| 2021/0089884 A1 | 3/2021 | Macready et al. |
| 2021/0125050 A1 | 4/2021 | Wang |
| 2021/0182612 A1 | 6/2021 | Zeng et al. |
| 2021/0232768 A1 | 7/2021 | Ling et al. |
| 2022/0006814 A1 | 1/2022 | Lin et al. |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naive Bayes Text Classifier", DatumBox Machine Learning Blog and Software Development News, Jan. 2014, pp. 1-11.

Fargo, Farah "Resilient Cloud Computing and Services", PHD Thesis, Department of Electrical and Computer Engineering, University of Arizona, 2015, pp. 1-115.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017.

Guo, Diansheng et al., "Detecting Non-personal and Spam Users on Geo-tagged Twitter Network", Transactions in GIS, 2014, pp. 370-384.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016.

Malik, Hassan, et al., "Automatic Training Data Cleaning for Text Classification", 11th IEEE International Conference on Data Mining Workshops, 2011, pp. 442-449.

Mietten, Markus et al., "ConXsense-Automated Context Classification for Context-Aware Access Control", Asia CCS'14, 2014, pp. 293-304.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Shi, Yue et al., "Cloudlet Mesh for Securing Mobile Clouds from Intrusions and Network Attacks", 2015 3rd IEEE International Conference on Mobile Cloud Computing, Services, and Engineering, pp. 109-118.

Taylor, Adrian et al., "Anomaly Detection in Automobile Control Network Data with Long Short-Term Memory Networks", IEEE 2016.

Taylor, Adrian "Anomaly-Based Detection of Malicious Activity in In-Vehicle Networks", Ph.D. Thesis, University of Ottawa 2017.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017.

Zhang, Ke et al., "Automated IT System Failure Prediction: A Deep Learning Approach", IEEE 2016.

\* cited by examiner

| No. | Example Feature Indicator | How system evaluates a security alert with respect to the feature indicator |
|---|---|---|
| 1. | First_Org: whether this alert is the first-time seen in the organization | System evaluates whether this feature indicator is true or false for the alert. Return value is a Boolean data type indicative of true or false. |
| 2. | First_Source: whether this alert is the first-time seen on the source device (e.g., a laptop) | System evaluates whether this feature indicator is true or false for the alert. Return value is a Boolean data type indicative of true or false. |
| 3. | New_Devices_n_days: whether this alert is seen on 3 new source devices in the past $n$ days. In one embodiment, $n$ is 7 for aggressive attacks, and 30 for slow attacks. | System evaluates whether this feature indicator is true or false for the alert. Return value is a Boolean data type indicative of true or false. |
| 4. | New_Vendor_n days: Whether the source device for this alert has seen alerts from 3 or more vendors in the past $n$ days (e.g., 7 days or 30 days). | System evaluates whether this feature indicator is true or false with respect to this alert. Return value is a Boolean data type indicative of true or false. |
| 5. | nAlertType7d: whether this alerts source device +vendor tuple sees >=2 alert_types in the past $n$ days (e.g., 7 days for aggressive attacks or 30 days for slow attacks) | System evaluates whether this feature indicator is true or false with respect to this alert. Return value is a Boolean data type indicative of true or false. |
| 6. | Alert_type: This alert's alert type. | For this feature indicator, the system returns a string with the alert type of the alert. |
| 7. | Alert_name: This alert's alert name. | For this feature indicator, the system returns a string with this alert type of the alert. |
| 8. | Severity_Level: This alert's severity level. | For this feature, the system returns a normalized string or numerical value indicative of the alert's severity value. |
| 9. | IOC: whether this alert shares some number of common indicators of compromise (IOCs), such as a md5 hash or an external IP, as other alerts in case management | System evaluates whether this feature indicator is true or false with respect to this alert. Return value is a Boolean data type indicative of true or false. |

FIG. 2

| fOrg | fDev | nNewDev7d | nVendor7d | nAlertTypes7 | alert_type | alert_name | alert_severit | e | risk |
|---|---|---|---|---|---|---|---|---|---|
| TRUE | TRUE | FALSE | FALSE | TRUE | Security risk found | Hacktool.Jsprat | - | Symantec EPP | 0.96013725 |
| TRUE | TRUE | FALSE | FALSE | TRUE | Security risk found | PUA.InstallCore | - | Symantec EPP | 0.96013725 |
| FALSE | TRUE | TRUE | FALSE | TRUE | SONAR detection now | WS.Reputation.1 | - | Symantec EPP | 0.94175561 |
| FALSE | TRUE | TRUE | FALSE | TRUE | Security risk found | WS.Reputation.1 | - | Symantec EPP | 0.9116811 |
| FALSE | TRUE | FALSE | FALSE | TRUE | Compressed File | Trojan.Gen.2 | - | Symantec EPP | 0.90799184 |
| FALSE | TRUE | FALSE | FALSE | TRUE | Attack | Nessus Vulnerability Scanner Activity | - | Symantec EPP | 0.90567713 |
| FALSE | TRUE | FALSE | FALSE | TRUE | OS Attack | SMB Validate Provider Callback CVE-2009-3103 | - | Symantec EPP | 0.85896298 |
| FALSE | TRUE | FALSE | FALSE | TRUE | Security risk found | NetCat | - | Symantec EPP | 0.85758069 |
| TRUE | TRUE | FALSE | FALSE | FALSE | System Infected | W32.Changeup Domain Request | - | Symantec EPP | 0.83569878 |
| TRUE | TRUE | FALSE | FALSE | FALSE | Compressed File | Trojan.Gen.NPE | - | Symantec EPP | 0.83441751 |
| TRUE | TRUE | FALSE | FALSE | FALSE | Compressed File | W97M.Downloader | - | Symantec EPP | 0.83441751 |
| FALSE | TRUE | FALSE | FALSE | TRUE | Virus found | Trojan.Gen.2 | - | Symantec EPP | 0.6436787 |
| FALSE | FALSE | FALSE | FALSE | TRUE | Salesforce | Malicious or Compromised Insider | 8 | Imperva Skyfence | 0.62849589 |
| FALSE | TRUE | TRUE | FALSE | FALSE | SONAR detection now | WS.Reputation.1 | - | Symantec EPP | 0.57988199 |
| FALSE | TRUE | TRUE | FALSE | FALSE | Confluence Web | Malicious or Compromised Insider | 8 | Imperva Skyfence | 0.55709864 |
| FALSE | FALSE | FALSE | FALSE | TRUE | cat= | Malicious or Compromised Insider | 8 | Imperva Skyfence | 0.55343442 |
| FALSE | FALSE | FALSE | FALSE | TRUE | Security risk found | NetCat | - | Symantec EPP | 0.54634205 |
| FALSE | FALSE | FALSE | FALSE | TRUE | Security risk found | PUA.InstallCore | - | Symantec EPP | 0.54634205 |
| FALSE | TRUE | FALSE | FALSE | FALSE | Confluence Web | Malicious or Compromised Insider | 8 | Imperva Skyfence | 0.53540959 |
| FALSE | FALSE | TRUE | FALSE | FALSE | OS Attack | Microsoft SMB MS17-010 Disclosure Attempt | - | Symantec EPP | 0.48858182 |
| FALSE | FALSE | TRUE | FALSE | FALSE | Security risk found | WS.Reputation.1 | - | Symantec EPP | 0.48574276 |
| TRUE | TRUE | FALSE | FALSE | FALSE | Virus found | Downloader.Upatrelgen5 | - | Symantec EPP | 0.47982922 |
| TRUE | TRUE | FALSE | FALSE | FALSE | Virus found | Linux.Lightaidra | - | Symantec EPP | 0.47982922 |
| FALSE | TRUE | TRUE | FALSE | FALSE | cat= | Malicious or Compromised Insider | 8 | Imperva Skyfence | 0.47556506 |
| FALSE | FALSE | TRUE | FALSE | FALSE | OS Attack | Microsoft SMB MS17-010 Disclosure Attempt | - | Symantec EPP | 0.47125444 |
| FALSE | TRUE | TRUE | FALSE | FALSE | Security risk found | WS.Reputation.1 | - | Symantec EPP | 0.46842384 |
| FALSE | TRUE | FALSE | FALSE | FALSE | cat= | Malicious or Compromised Insider | 8 | Imperva Skyfence | 0.45379791 |
| FALSE | FALSE | TRUE | FALSE | FALSE | Web Attack | Malvertisement Website Redirect 10 | - | Symantec EPP | 0.44679877 |
| FALSE | FALSE | TRUE | FALSE | FALSE | Web Attack | Malvertisement Website Redirect 15 | - | Symantec EPP | 0.44679877 |
| FALSE | FALSE | TRUE | FALSE | FALSE | Web Attack | Malvertisement Website Redirect 21 | - | Symantec EPP | 0.44679877 |
| FALSE | FALSE | TRUE | FALSE | FALSE | attack | attack | - | Morphisec | 0.44207307 |

FIG. 3

RANKING CYBERSECURITY ALERTS FROM MULTIPLE SOURCES USING MACHINE LEARNING

RELATED APPLICATIONS

This application claims the benefit of U.S. Provisional Application No. 63/039,347, filed on Jun. 15, 2020 and titled "Ranking Security Alerts from Multiple Sources Using Machine Learning," the contents of which are incorporated by reference herein as if fully disclosed herein.

BACKGROUND OF THE INVENTION

1. Field of the Invention

This invention relates generally to cybersecurity analytics in computer networks, and, more specifically, to ranking cybersecurity alerts from multiple sources using machine learning.

2. Description of the Background Art

Organizations are faced with the ever-increasing risks from security threats. Some cyberattacks are perpetrated by outsiders, while others involve insiders. Organizations typically run various cybersecurity products from different vendors. For example, one vendor may detect for malware installed on user devices, and another vendor may model and analyze user behavior to detect anomalies. Each of the different products generate alerts when a suspicious activity for which they are monitoring occurs. For a large organization with many employees, this can result in a large volume of alerts on a daily basis.

The analysts (e.g., Tier-1 analysts, Tier-3 analysts) that process these security alerts are often overwhelmed by the number of alerts. Because of the high volume of alerts, they are not able to quickly decide which alerts are not interesting and which are worthy of further investigation. A cybersecurity analyst may face over 10,000 alerts in a month and over half of them may be false positives. At many organizations, a significant percentage (e.g., 25-75%) of alerts are simply ignored because the organization cannot keep up with the alert volume. Therefore, there is demand for a system that ranks alerts from different sources so that analysts can prioritizes their attentions and focus on the alerts most likely to relate to a malicious event in the network. Such a system would greatly improve the efficiency of these analysts and enable the analysts to better monitor for cybersecurity risks.

SUMMARY OF THE DISCLOSURE

The present disclosure relates to a machine-learning system, method, and computer program for ranking cybersecurity alerts from multiple alert-generation sources in a network. The system uses past alert data to self-learn risk levels associated with alerts from different sources. Specifically, as described in more detail below, for each alert, the system calculates the probability that the alert is a cybersecurity risk based on characteristics of the alert and historical alert data from the various alert-generation sources in the network being monitored.

Multiple network-monitoring applications generate security alerts, which are received by the alert ranking system. In response to receiving a security alert from one of a plurality of alert-generation sources, the alert-ranking system evaluates the security alert with respect to a plurality of feature indicators. The system identifies values for the feature indicators with respect to the alert, and creates a feature vector representation of the alert based on the identified values. The system then calculates a probability that the security alert relates to a cybersecurity risk in the computer network based on the created feature vector and historical alert data in the network. In certain embodiments, the calculated risk probability is a Bayes probability calculated as a function of the probability of seeing the feature vector with respect to a cybersecurity risk and the probability of seeing the feature vector with respect to legitimate or low-interest activity.

A risk probability is calculated for each alert received, and the system ranks the security alerts based on the calculated risk probabilities. The ranked list includes alerts from a plurality of different network-monitoring applications, therefore providing cybersecurity analysts with a unified alert ranking system.

BRIEF DESCRIPTION OF THE FIGURES

FIG. 2 is a table that illustrates example feature indicators for security alerts.

FIG. 3 is a table that illustrates an example ranking of security alerts.

DETAILED DESCRIPTION OF THE PREFERRED EMBODIMENTS

The present disclosure describes a machine-learning system, method, and computer program for ranking security alerts. The method is performed by a computer system that receives security alerts for a computer network monitored for cybersecurity risks and attacks ("the system"). The system learns from past data to rank alerts. As described in more detail below, the system creates a feature vector representation of each incoming alert, and then calculates the probability that malicious activity has occurred given the feature vector and past alert data. The calculated probability is used to rank the alert.

Figure 1:
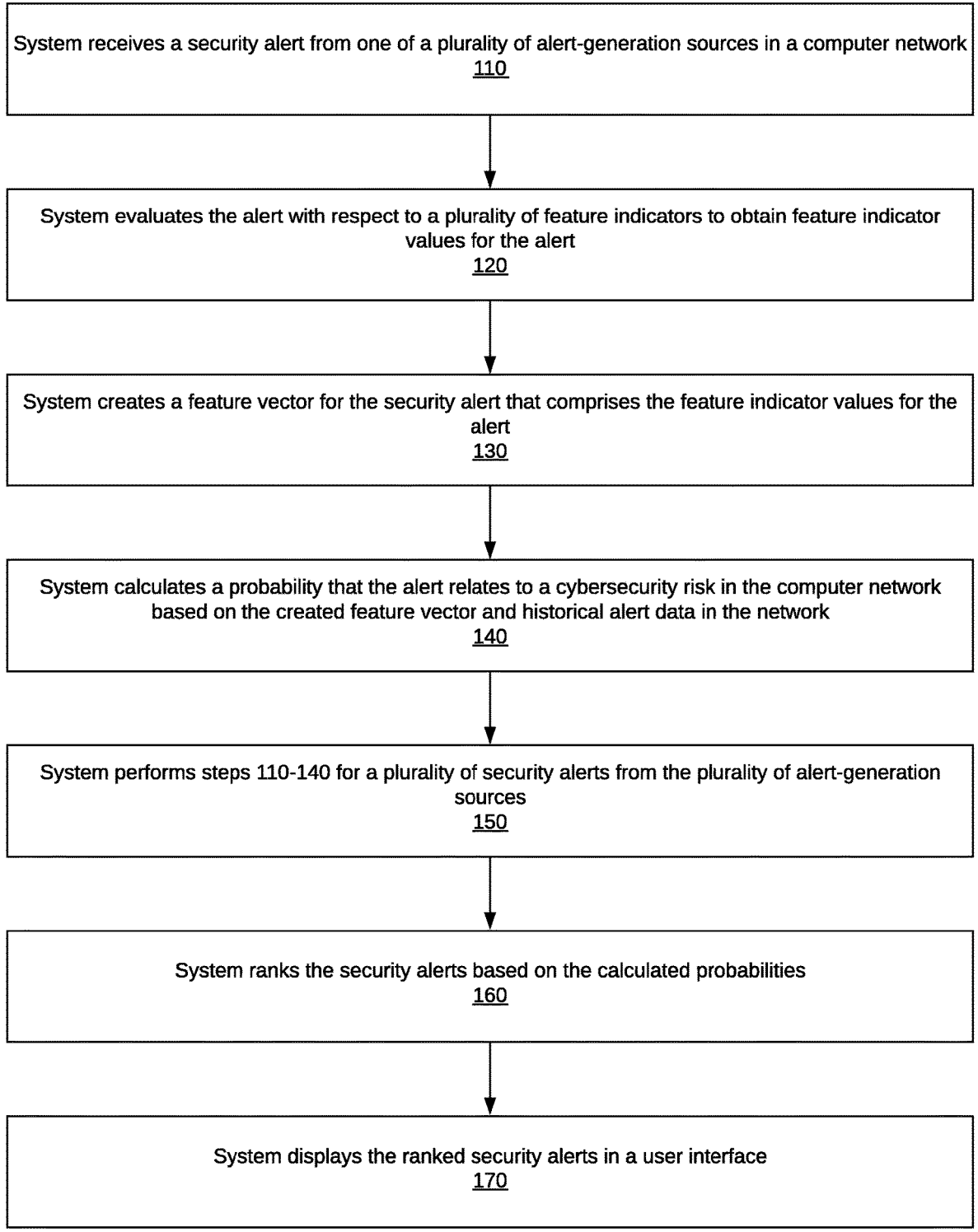
FIG. 1 is a flowchart that illustrates a method, according to one embodiment, for ranking computer network security alerts from multiple alert-generation sources.

FIG. 1 illustrates a method for ranking computer network security alerts from multiple sources. The illustrated method is described in more detail below.

1. Evaluating a Security Alert with Respect to Feature Indicators

The system receives a security alert for a computer network from one of a plurality of alert-generation sources (step 110). Alerts are generated by various sources within the monitored computer network. Example sources are third-party security product vendors that produce data loss prevention alerts, web traffic alerts, and endpoint malware alerts, etc. In other cases, an alert may be generated by a user behavior analytics (UBA) or a user and entity behavior analytics (UEBA) system. An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

The system evaluates the security alert with respect to multiple feature indicators and identifies values for the feature indicators with respect to the alert (step 120). The feature indicators represent features of an alert or context information for an alert. For some feature indicators, the system may determine whether the feature indictor evaluates to true or false with respect to the alert. In such cases, the value of the feature indicator with respect to the alert may be a Boolean data type corresponding to true or false. For other feature indicators, the value may be a numerical value within a range (e.g., an number representing a severity level) or a text string (e.g., the alert type or name). The table in FIG. 2 lists nine example feature indicators and the corresponding values for which the feature indicators are evaluated, but these are just examples and invention is not limited to these feature indicators.

2. Creating a Feature Vector Representation of the Alert

The system creates a feature vector representation of the alert (step 130). Specifically, the system creates a feature vector for the alert that includes the evaluated values for feature indicators with respect to the alert. Let $\vec{f}_a = (f_1, f_2, \ldots f_i)$ denote a feature vector for an alert, where there are I feature indicators and $f_i$ is the value for the ith feature indicator.

3. Calculating a Probability that the Security Alert Relates to a Cybersecurity Risk.

The system calculates a probability that that security alert relates to a cybersecurity risk (i.e., to malicious activity in the network) based on the alert's feature vector and the historical alert data for the monitored network (step 140) In one embodiment, the risk probability is a Bayes probability calculated as a function of the probability of seeing the feature vector with respect to a cybersecurity risk and the probability of seeing the feature vector with respect to legitimate activity. Specifically, the probability may be calculated by the system as follows.

$$P(M|\vec{f}_a) = \frac{P(\vec{f}_a|M)P(M)}{P(\vec{f}_a|M)P(M) + P(\vec{f}_a|L)P(L)}$$

Where:

$P(M|\vec{f}_a)$ is the posterior probability that the alert relates to a cybersecurity risk given the feature vector $\vec{f}_a$;

$P(\vec{f}_a|L)$ is the likelihood of observing the feature vector in connection with legitimate or low-interest activity. The system learns $P(\vec{f}_a|L)$ based on the features observed in past alerts. In one embodiment, $P(\vec{f}_a|L)$ is a function of how often $\vec{f}_a$ has been observed in the monitored network and is the calculated by the system as follows:

$$P(\vec{f}_a|L) = \frac{\text{count of observed alerts each with } \vec{f}_a}{\text{count of all observed alerts}}$$

$P(\vec{f}_a|M)$ is the likelihood of observing the feature vector in connection with a cybersecurity risk (i.e., in connection with malicious activity in the monitored network).

In one embodiment, $P(\vec{f}_a|M)$ is assumed to be uniform in which case can be calculated by the system as follows:

$$P(\vec{f}_a|M) = \frac{1}{\text{number of distinct } \vec{f}_a}$$

P(M) is the a-priori probability of a cybersecurity risk. P(L) is the a-priori probability of a legitimate or low-interest activity. In one embodiment, P(M) and P(L) are set to the value 0.5.

Computationally it may not be practical for the system to calculate $P(\vec{f}_a|L)$ and $P(\vec{f}_a|M)$ based on joint modeling of all the feature indicators. For example, in the case of the feature indictors in the table in FIG. 2, "fOrg," "fDev," "nNewDev7d," "nVendor7d" are binary features, each with a true/false values. Therefore, the total number of feature values is small, or at most $2^4$ possible scenarios. However, the feature indicators "alert_type" and "alert_name" may have 10 or 20 different values. If the features are modeled jointly, there are $2^4*10*10$ possible scenarios (assuming 10 different values for each), which requires a significant amount of data volume to calculate $P(\vec{f}_a|L)$ and $(\vec{f}_a|M)$.

It is more computationally efficient to divide $f_a$ into two or more subsets, calculate $P(\vec{f}_a|L)$ and $P(\vec{f}_a|M)$ for each subset, and then calculate the product of the probabilities for each subset. This can be denoted mathematically as follows:

$$P(\vec{f}_a|L) = \prod_{j=1}^{J} P(\vec{g}_i|L)$$

$$P(\vec{f}_a|M) = \prod_{j=1}^{J} P(\vec{g}_i|M)$$

Where there are J conditional independent groups $\vec{g}_i$, each consisting of a non-overlapping subset of features $f_a$, and where $P(\vec{g}_i|L)$ and $P(\vec{g}_i|M)$ are calculated by the system as follows:

$$P(\vec{g}_i|L) = \frac{\text{count of observed alerts each with } \vec{g}_i}{\text{count of all observed alerts}}$$

$$P(\vec{g}_i|M) = \frac{1}{\text{number of distinct } \vec{g}_i}$$

The groups may be divided based on which feature indicators are considered probabilistically independent of each other, such that each group is probabilistically independent of the other groups with respect to $P(\vec{g}_i|L)$ and $P(\vec{g}_i|M)$. For example, for the feature indicators listed in FIG. 2, the features 1-5 may be a first group, features 6-7 may be a second group, feature 8 may be a third singleton group, and feature 9 may be a fourth singleton group.

In certain embodiments, instead of assuming $P(\vec{g}_i|M)$ is uniform, human knowledge can be injected to influence the risk rankings. For example, if $\vec{g} = \{\text{alert\_type}\}$ and we know a priori that alerts with alert_type="web attack" are not a good malicious indicator, then an administrator of the system can set P(alert_type='web attack'|M) to a smaller number than the rest of the P(alert_Type|M) likelihoods.

In one embodiment, the system profiles alert data in a monitored computer network for a number of days (e.g., 7 days) prior to calculating the risk probabilities and ranking security alerts. Since the probabilities are based in part on alert history in the monitored network, this helps optimize the probability calculations.

4. Ranking Security Alerts Based on the Calculated Risk Probabilities

In one embodiment, the above-described steps are performed for each security alert received by the system to calculate a risk probability for each alert (step 150). The system ranks the security alerts based on the risk probabilities and displays the ranked alerts (steps 160-170). The alerts are preferably ranked and displayed in descending order of risk probability (i.e., highest-risk alerts are ranked highest and displayed at the top of the list). The ranked list may be limited to alerts received within a certain time period (e.g., a 24 hour window).

FIG. 3 illustrates an example of the displayed ranking in which the feature indicators are the same as those listed in the table in FIG. 2. The display includes the feature indicator values for the ranked alerts. Displaying the feature indicator values for the alert enables an analyst to easily see the features associated with high-ranking alerts. For example, the highest-ranked alert in FIG. 3 has alert_name "Hacktool.Jsprat" with alert_type "Security risk found" and the alert has the following features:

the first-time-seen-in-org is True (i.e., First_Org is true);
first-time-seen-in-device is True (i.e., First_Source is true);
the feature for having more than its source device+vendor tuple sees>=2 alert_types returns True (i.e., nAlertType7d is true); and
the alert_type is 'Security risk found".

In certain embodiments, the system determines the risk probability for each alert in substantially real time as alerts are received by the system, and updates the displayed ranking in substantially real time as new alerts are received by the system.

5. Example Software Architecture

Figure 4:
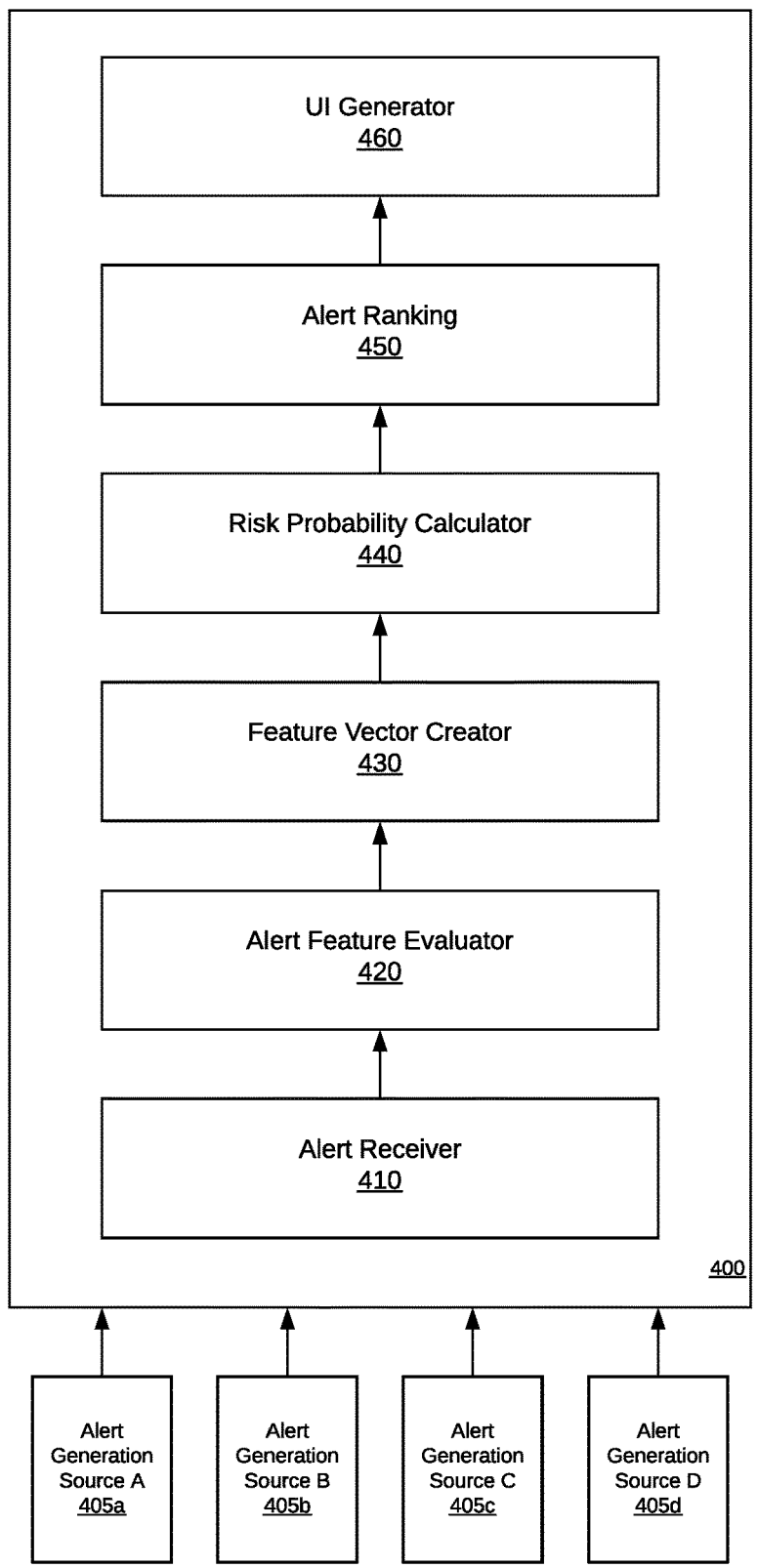
FIG. 4 is a block diagram that illustrates an example software architecture for a cybersecurity alert-ranking system.

FIG. 4 illustrates an example software architecture for a system 400 that performs the methods described herein. However, the methods described herein may be implemented in other systems and are not limited to system 400. An Alert Receiver module 410 receives (or retrieves) alerts generated by a plurality of different alert generation sources 405*a-d*. The Alert Feature Evaluator model 420 evaluates alerts with respect to a set of feature indicators and determines feature indicator values for each alert. Feature Vector Creation module 430 creates a feature vector for each alert using the feature indicator values for the alert. The Risk Probability Calculator module 440 calculates a probability that an alert relates to a cybersecurity risk based on the alert's feature vector and historical alert data. The Alert Ranking module 450 ranks alerts based on the risk probabilities calculated for the alerts. The UI Generator module 460 generates a user interface that displays alert rankings, such as the top ranked alerts.

6. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for ranking computer network security alerts from multiple sources, the method comprising:
   (a) receiving a security alert from one of a plurality of alert-generation sources in a computer network;
   (b) evaluating the security alert with respect to a plurality of feature indicators to obtain feature indicator values for the security alert;
   (c) creating a feature vector for the security alert that includes the feature indicator values for the security alert;
   (d) calculating a probability that the security alert relates to a cybersecurity risk in the computer network based on the created feature vector and historical alert data in the network, wherein the probability is a Bayes probability calculated as a function of the probability of seeing the feature vector with respect to a cybersecurity risk and the probability of seeing the feature vector with respect to legitimate or low-interest activity, wherein calculating the probability of seeing the feature vector with respect to a cybersecurity risk and the probability of seeing the feature vector with respect to legitimate or low-interest activity comprises: dividing the feature vector for the alert into a plurality of non-overlapping subsets to create a plurality of subset feature vectors, for each subset feature vector, calculating a probability of seeing the subset feature vector with respect to a cybersecurity risk and a probability of seeing the subset feature vector with respect to legitimate or low-interest activity, and calculating the product of the probabilities calculated for the subset feature vectors to obtain the probability of seeing the feature vector with respect to a cybersecurity risk and the probability of seeing the feature vector with respect to legitimate or low-interest activity;
   (e) performing steps (a)-(d) for a plurality of security alerts from the plurality of alert-generation sources;
   (f) ranking the security alerts based on the calculated probabilities; and
   (g) displaying the ranked security alerts, wherein the alert ranking includes alerts from a plurality of alert-generation sources.

2. The method of claim 1, wherein displaying the alert ranking includes displaying the values of the feature indicators for the ranked alerts.

3. The method of claim 1, wherein the risk probability for alerts is calculated in substantially real time as alerts are received by the system, and wherein the alert ranking is updated in substantially real time as new alerts are received by the system.

4. A non-transitory computer-readable medium comprising a computer program, that, when executed by a computer system, enables the computer system to perform the following method for ranking computer network security alerts from multiple sources, the method comprising:
   (a) receiving a security alert from one of a plurality of alert-generation sources in a computer network;

(b) evaluating the security alert with respect to a plurality of feature indicators to obtain feature indicator values for the security alert;
(c) creating a feature vector for the security alert that includes the feature indicator values for the security alert;
(d) calculating a probability that the security alert relates to a cybersecurity risk in the computer network based on the created feature vector and historical alert data in the network, wherein the probability is a Bayes probability calculated as a function of the probability of seeing the feature vector with respect to a cybersecurity risk and the probability of seeing the feature vector with respect to legitimate or low-interest activity, wherein calculating the probability of seeing the feature vector with respect to a cybersecurity risk and the probability of seeing the feature vector with respect to legitimate or low-interest activity comprises: dividing the feature vector for the alert into a plurality of non-overlapping subsets to create a plurality of subset feature vectors, for each subset feature vector, calculating a probability of seeing the subset feature vector with respect to a cybersecurity risk and a probability of seeing the subset feature vector with respect to legitimate or low-interest activity, and calculating the product of the probabilities calculated for the subset feature vectors to obtain the probability of seeing the feature vector with respect to a cybersecurity risk and the probability of seeing the feature vector with respect to legitimate or low-interest activity;
(e) performing steps (a)-(d) for a plurality of security alerts from the plurality of alert-generation sources;
(f) ranking the security alerts based on the calculated probabilities; and
(g) displaying the ranked security alerts, wherein the alert ranking includes alerts from a plurality of alert-generation sources.

5. The non-transitory computer-readable medium of claim 4, wherein displaying the alert ranking includes displaying the values of the feature indicators for the ranked alerts.

6. The non-transitory computer-readable medium of claim 4, wherein the risk probability for alerts is calculated in substantially real time as alerts are received by the system, and wherein the alert ranking is updated in substantially real time as new alerts are received by the system.

7. A computer system for ranking computer network security alerts from multiple sources, the system comprising:
one or more processors;
one or more memory units coupled to the one or more processors, wherein the one or more memory units store instructions that, when executed by the one or more processors, cause the system to perform the operations of:
(a) receiving a security alert from one of a plurality of alert-generation sources in a computer network;
(b) evaluating the security alert with respect to a plurality of feature indicators to obtain feature indicator values for the security alert;
(c) creating a feature vector for the security alert that includes the feature indicator values for the security alert;
(d) calculating a probability that the security alert relates to a cybersecurity risk in the computer network based on the created feature vector and historical alert data in the network, wherein the probability is a Bayes probability calculated as a function of the probability of seeing the feature vector with respect to a cybersecurity risk and the probability of seeing the feature vector with respect to legitimate or low-interest activity, wherein calculating the probability of seeing the feature vector with respect to a cybersecurity risk and the probability of seeing the feature vector with respect to legitimate or low-interest activity comprises: dividing the feature vector for the alert into a plurality of non-overlapping subsets to create a plurality of subset feature vectors, for each subset feature vector, calculating a probability of seeing the subset feature vector with respect to a cybersecurity risk and a probability of seeing the subset feature vector with respect to legitimate or low-interest activity, and calculating the product of the probabilities calculated for the subset feature vectors to obtain the probability of seeing the feature vector with respect to a cybersecurity risk and the probability of seeing the feature vector with respect to legitimate or low-interest activity;
(e) performing steps (a)-(d) for a plurality of security alerts from the plurality of alert-generation sources;
(f) ranking the security alerts based on the calculated probabilities; and
(g) displaying the ranked security alerts, wherein the alert ranking includes alerts from a plurality of alert-generation sources.

8. The system of claim 7, wherein displaying the alert ranking includes displaying the values of the feature indicators for the ranked alerts.

9. The system of claim 7, wherein the risk probability for alerts is calculated in substantially real time as alerts are received by the system, and wherein the alert ranking is updated in substantially real time as new alerts are received by the system.

* * * * *